United States Patent
Choi et al.

(10) Patent No.: US 6,768,527 B2
(45) Date of Patent: Jul. 27, 2004

(54) LIQUID CRYSTAL DISPLAY WITH FERROELECTRIC LIQUID CRYSTAL FORMED IN A POLYMER NETWORK AND FABRICATING METHOD THEREOF

(75) Inventors: Suk Won Choi, Anyang-shi (KR); Su Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/005,094

(22) Filed: Dec. 7, 2001

(65) Prior Publication Data

US 2002/0080305 A1 Jun. 27, 2002

(30) Foreign Application Priority Data

Dec. 22, 2000 (KR) ........................................ P2000-80735

(51) Int. Cl.[7] ............................................. G02F 1/1333
(52) U.S. Cl. ........................ 349/88; 349/133; 349/172
(58) Field of Search ............................ 349/86, 88, 93, 349/133, 171, 172, 188

(56) References Cited

U.S. PATENT DOCUMENTS

| | | | |
|---|---|---|---|
| 5,566,009 A | * 10/1996 | Yamazaki et al. | 349/86 |
| 5,790,217 A | * 8/1998 | Lee et al. | 349/86 |
| 5,812,230 A | * 9/1998 | Sakaigawa et al. | 349/166 |
| 5,877,834 A | * 3/1999 | Sako et al. | 349/171 |
| 5,942,155 A | * 8/1999 | Coles et al. | 252/299.64 |
| 5,949,508 A | * 9/1999 | Kumar et al. | 349/122 |
| 6,038,009 A | * 3/2000 | Miyazaki et al. | 349/188 |

FOREIGN PATENT DOCUMENTS

JP    4-281425 A   * 10/1992   ......... G02F/1/1333

OTHER PUBLICATIONS

Stanley Wolf and Richard N. Tauber, "Silicon Processing for the VLSI Era—vol. 1: Process Technology," Second Edition, Lattice Press, Sunset Beach, California (2000), pp. 588–590.*

H. Furue et al., "Mesogenic Polymer Stabilized Ferroelectric Liquid Crystal Display Exhibiting Monostability with High Contrast Ratio and Grayscale Capability," Japanese Journal of Applied Physics, vol. 36, pt. 2, No. 11B, Nov. 1997, pp. L1517–L1519.*

* cited by examiner

*Primary Examiner*—Carl Whitehead, Jr.
*Assistant Examiner*—Stephen W. Smoot
(74) *Attorney, Agent, or Firm*—McKenna Long & Aldridge LLP

(57) ABSTRACT

A ferroelectric liquid crystal display and a fabricating method thereof that is capable of maintaining a stable alignment state against external temperature variation and external impact. In the method and apparatus, a ferroelectric liquid crystal containing a small amount of light-hardening polymer is injected between upper and lower substrates provided with alignment film. An ultraviolet ray is irradiated thereon to form a polymer network. The ultraviolet ray has a light intensity range of about 1 to about 5 mW/cm$^2$, and has a light energy range of about 240 to about 1200 mJ/cm$^2$.

9 Claims, 7 Drawing Sheets

ALIGNED DIRECTION OF ALIGNMENT FILM

US 6,768,527 B2

LIQUID CRYSTAL DISPLAY WITH FERROELECTRIC LIQUID CRYSTAL FORMED IN A POLYMER NETWORK AND FABRICATING METHOD THEREOF

This application claims the benefit of Korean Patent Application No. P2000-80735, filed on Dec. 22, 2000, the entirety of which is hereby incorporated by reference for all purposes as if fully set forth herein.

BACKGROUND OF THE INVENTION

1. Field of the Invention

This invention relates to a liquid crystal display, and more particularly to a ferroelectric liquid crystal display that is capable of keeping a stable alignment state against external temperature variation and external impact. The invention also is directed to a method of fabricating the above-mentioned liquid crystal display.

2. Description of the Related Art

Generally, a liquid crystal display (LCD) controls light in accordance with a liquid crystal alignment state to thereby display a desired picture on the screen. A liquid crystal used for such an LCD is in a neutral phase between a liquid state and a solid state, which has both a fluidity and an elasticity. In a thermodynamic phase transition process of the liquid crystal, a liquid crystal having a smectic C phase is rotated along a smectic layer taking a layer structure having the same electrical and magnetic property. In other words, the smectic C phase liquid crystal is rotated along an outer line of a virtual cone.

Such a smectic C phase liquid crystal has a characteristic of having a spontaneous polarization regardless of an external electric field. This liquid crystal is usually referred to as a "ferroelectric liquid crystal" (FLC). The FLC has been actively studied in light of its fast response speed according to its spontaneous polarization characteristic and an ability to realize a wide viewing angle without a special electrode structure and a compensating film. The FLC includes a deformed helix FLC mode, a surface stabilized FLC mode, an anti-FLC mode, a V-type FLC mode and a half V-type FLC mode, etc. Hereinafter, the V-type FLC mode and the half V-type FLC mode will be described.

FIG. 1 shows an alignment state of a liquid crystal cell in the V-type FLC mode.

Referring to FIG. 1, the liquid crystal cell in the V-type FLC mode includes an upper substrate 1 on which a common electrode 3 and an alignment film 5 are disposed; a lower substrate 11 on which a TFT array 9 including a pixel electrode and an alignment film 7 are disposed; and a liquid crystal 13 injected between the upper and lower substrates 1 and 11. The alignment films 5 and 7 are aligned into a desired state by rubbing. The injected liquid crystal 13 forms a smectic layer having a layer structure and is arranged into a phase having a desired slope with respect to a plane perpendicular to the smectic layer. In other words, the liquid crystal 13 has a desired inclination angle with respect to an aligned direction of the alignment film and is aligned such that the adjacent smectic layers have opposite polarities with respect to each other.

FIG. 2 shows the relationship between transmissivity (T) and voltage (V) of the V-type FLC mode liquid crystal cell. The liquid crystal 13 within the V-type FLC mode liquid crystal cell responds to positive and negative voltages applied thereto. Since the transmittance is suddenly changed according to an application of positive and negative voltages, a T-V curve has a V-shape. In other words, a transmittance is increased as a positive voltage increases, whereas a transmittance is decreased as a negative voltage increases.

FIG. 3 shows an alignment state of a liquid crystal cell in the half V-type FLC mode.

In FIG. 3, a liquid crystal 15 within the half V-type FLC mode liquid crystal cell injected between the upper substrate 1 and the lower substrate 11 forms a smectic layer having a layer structure. The liquid crystal 15 is aligned at a desired inclination angle with respect to an alignment treatment direction of the alignment films 5 and 7 such that the adjacent smectic layers have a different polarity unlike the liquid crystal 13 in the V-type FLC mode. Such a half V-type mode liquid crystal can be implemented by applying a positive or negative electric field in advance and, at the same time, lowering its temperature into a temperature having a smectic phase. The half V-type FLC mode liquid crystal 15 formed in this manner responds to only one of the applied positive and negative voltages. Thus, as seen from FIG. 4, the T-V curve has a half V-shape in the half V-type FLC mode. The T-V characteristic in FIG. 4 represents when a negative voltage is used to make an initial uniform alignment. In this case, a transmittance appears not to increase upon application of a negative voltage, whereas it is increased in accordance with an increase in a positive voltage. Otherwise, when a positive voltage is used to make an initial uniform alignment, a transmittance is increased in accordance with an increase in a negative voltage.

A thermodynamic phase transition process of the half V-type FLC mode liquid crystal 15 is as follows:

Isotropic→nematic (N*) phase→smectic C*(Sm C*) phase→crystal

Such a phase transition process expresses a liquid crystal phase resulting from a gradual decrease in temperature going from left to right. The liquid crystal 15 is aligned in parallel to a rubbing direction when its temperature is slowly lowered to reach a temperature having a nematic phase after the liquid crystal 15 was injected into the liquid crystal cell at a temperature having an isotropic phase. If an electric field is applied to the interior of the cell with a temperature being slowly lowered in this state, then the liquid crystal 15 is phase-changed into a smectic phase. A direction of a spontaneous polarization of the liquid crystal 15 generated at this time is arranged in such a manner to be consistent with that of an electric field formed at the interior of the cell. As a result, when the liquid crystal 15 within the liquid crystal cell is subjected to a parallel alignment treatment, it makes one of two possible molecule arrangements. The molecule arrangement in the spontaneous polarization direction is consistent with the direction of an electric field applied in the phase transition process, and thereby has a uniform alignment state.

This uniform alignment state will be described in detail with reference to FIG. 5 and FIG. 6 below. First, as seen from FIG. 5, if a negative electric field E (−) is applied upon alignment of the liquid crystal 15, then a spontaneous polarization direction of the liquid crystal 15 identical to the electric field direction is made to provide a uniform alignment. In such a liquid crystal cell, as shown in FIG. 6, a liquid crystal arrangement is changed upon application of a positive electric field E (+) while a liquid crystal arrangement is not changed upon application of a negative electric field E (−).

In order to utilize a response characteristic to an electric field of the liquid crystal 15, polarizers perpendicular to each other are arranged at the upper and lower portions of the liquid crystal cell. At this time, a transmission axis of one polarizer is arranged to be consistent with an initial liquid crystal alignment direction. In the liquid crystal cell having the above-mentioned arrangement, the T-V curve has a half V-shape as shown in FIG. 7, experimentally. With respect to a negative electric field E (−), a liquid crystal arrangement is not changed to block the light. In contrast, with respect to a positive electric field E (+), a liquid crystal arrangement is changed to transmit the light. In this case, as a positive electric field E (+) increases, a transmittance also increases.

As described above, the half V-type FLC mode liquid crystal uses both a temperature and an electric field so as to obtain a uniform alignment. However, the liquid crystal cell made in this manner causes a phenomenon of breaking an initial uniform alignment when external impact is applied thereto during a grinding process of a shorting bar.

Also, when a heat stress is applied to the conventional half V-type FLC mode liquid crystal cell, a phenomenon of breaking a uniform alignment occurs. The T-V curve of the liquid crystal cell to which a heat stress above a phase transition temperature is applied during a certain time when the liquid crystal has an isotropic phase or a nematic phase is illustrated in FIG. 8. In other words, a transmission characteristic according to a voltage prior to a heat stress has a typical half V-shape, whereas a transmission characteristic according to a voltage after a heat stress is changed into an asymmetrical V-shape. This means that an initial uniform alignment fails to be sustained due to external heat stress.

When an initial uniform alignment has been broken as mentioned above, it is necessary to make a treatment utilizing a temperature and an electric field so as to obtain an alignment as uniform as the initial alignment. However, since it is not easy to apply a uniform DC voltage to the electrodes of the upper and lower substrates in comparison with when the shorting bars have been connected, it becomes difficult to obtain a uniform alignment.

SUMMARY OF THE INVENTION

Accordingly, the present invention is directed to a ferroelectric liquid crystal display and a fabricating method thereof that substantially obviates one or more of the problems due to limitations and disadvantages of the related art.

An advantage of the present invention is to provide a ferroelectric liquid crystal display and a fabricating method thereof that is capable of keeping a stable alignment state against external temperature variation and external impact. The invention also is directed to a method of fabricating the above-mentioned liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages of the invention, a ferroelectric liquid crystal display according to one aspect of the present invention includes an upper substrate provided with a transparent electrode and an alignment film undergoing an alignment treatment; a lower substrate opposed to the upper substrate and provided with a pixel electrode and an alignment film undergoing an alignment treatment; and a ferroelectric liquid crystal injected between the upper and lower substrates and containing a small amount of light-hardening polymer to form a polymer network.

In the ferroelectric liquid crystal display, a temperature upon injection of the ferroelectric liquid crystal is above a temperature causing a phase transition from a smectic phase into a nematic phase.

A direct current voltage is applied to the electrodes of the upper and lower substrates when the ferroelectric liquid crystal is uniformly aligned.

A temperature is varied such that the ferroelectric liquid crystal is changed from a nematic phase into a smectic phase at least once when the ferroelectric liquid crystal is uniformly aligned.

A light intensity range of an ultraviolet ray exposed when the polymer network is formed is about 1 to about 5 mW/cm$^2$.

A range of total exposure energy of an ultraviolet ray exposed when the polymer is formed is about 240 to about 1200 mJ/cm$^2$.

An ultraviolet lamp for generating the ultraviolet ray is selected from any one of an Hg lamp and a Xe lamp.

A wavelength range of the ultraviolet ray is about 365±100 nm.

A method of fabricating a ferroelectric liquid crystal display according to another aspect of the present invention includes joining an upper substrate provided with a transparent electrode and an alignment film undergoing an alignment treatment to a lower substrate opposed to the upper substrate and provided with a pixel electrode and an alignment film undergoing an alignment treatment; injecting a ferroelectric liquid crystal adding a light-hardening polymer between the joined upper and lower substrates; uniformly aligning the ferroelectric liquid crystal; and exposing an ultraviolet ray to the uniformly aligned liquid crystal cell.

In the method, a temperature upon injection of the ferroelectric liquid crystal is above a temperature causing a phase transition from a smectic phase into a nematic phase.

A direct current voltage is applied to the electrodes of the upper and lower substrates when the ferroelectric liquid crystal is uniformly aligned.

A temperature is varied such that the ferroelectric liquid crystal is changed from a nematic phase into a smectic phase at least once when the ferroelectric liquid crystal is uniformly aligned.

A light intensity range of an ultraviolet ray exposed when the polymer network is formed is about 1 to about 5 mW/cm$^2$.

A range of total exposure energy of an ultraviolet ray exposed when the polymer is formed is about 240 to about 1200 mJ/cm$^2$.

An ultraviolet lamp for generating the ultraviolet ray is selected from any one of an Hg lamp and a Xe lamp.

A wavelength range of the ultraviolet ray is about 365±100 nm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

In the drawings.

DETAILED DESCRIPTION OF THE ILLUSTRATED EMBODIMENT

Reference will now be made in detail to an embodiment of the present invention, examples of which are illustrated in the accompanying drawings.

FIGS. 9A to 9D show a process of fabricating a FLC mode liquid crystal cell according to an embodiment of the present invention.

Figure 1:
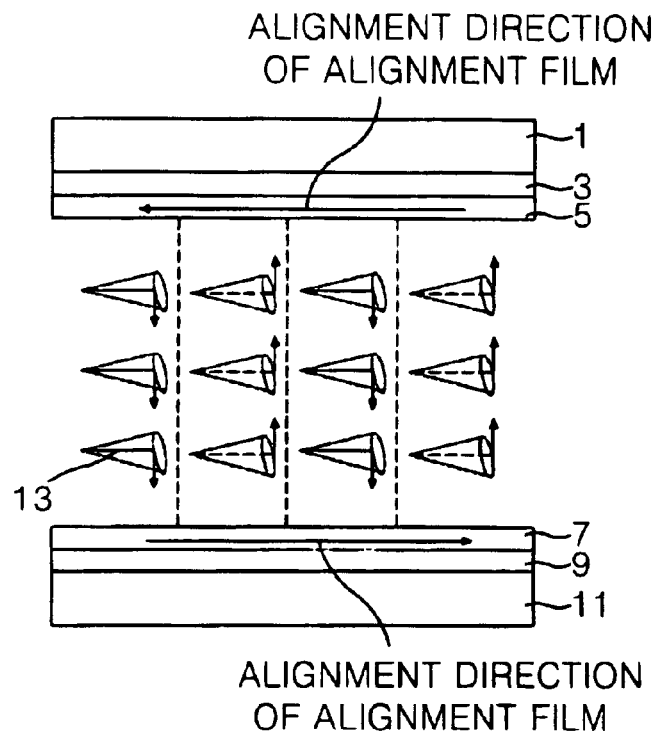
FIG. 1 illustrates an alignment state of a liquid crystal cell in a conventional V-type FLC mode.
Figure 2:
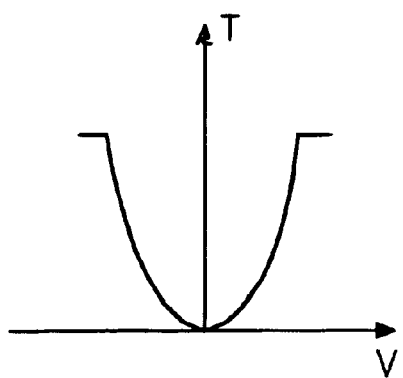
FIG. 2 is a graph representing a transmittance according to a voltage of the V-type FLC mode liquid crystal cell.
Figure 3:
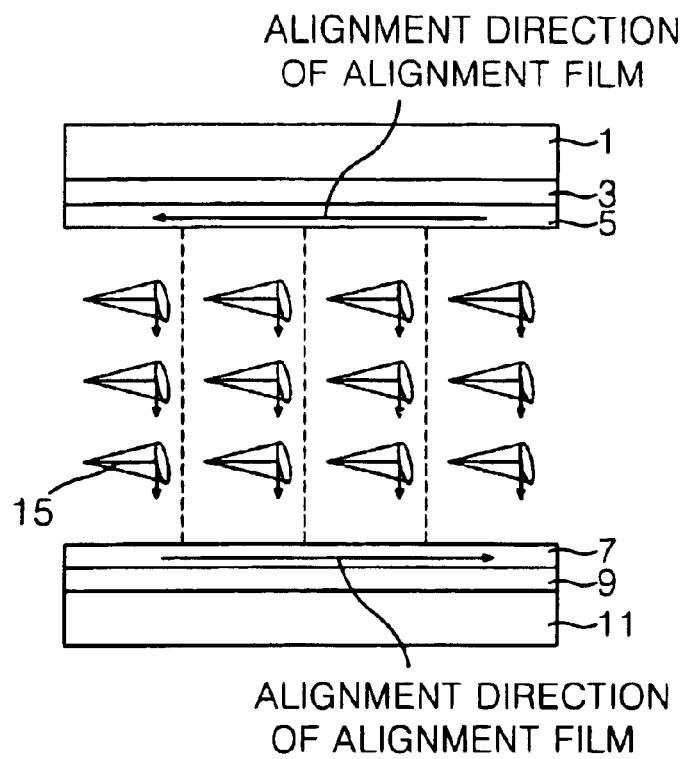
FIG. 3 illustrates an alignment state of a liquid crystal cell in a conventional half V-type FLC mode.
Figure 4:
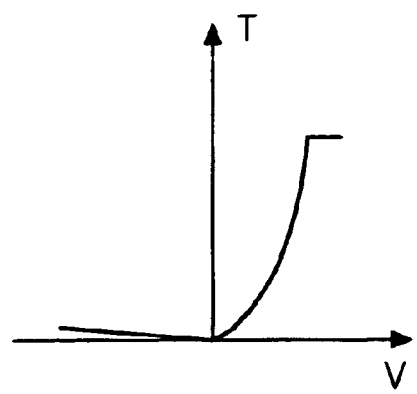
FIG. 4 is a graph representing a transmittance according to a voltage of the half V-type FLC mode liquid crystal cell.
Figure 5:
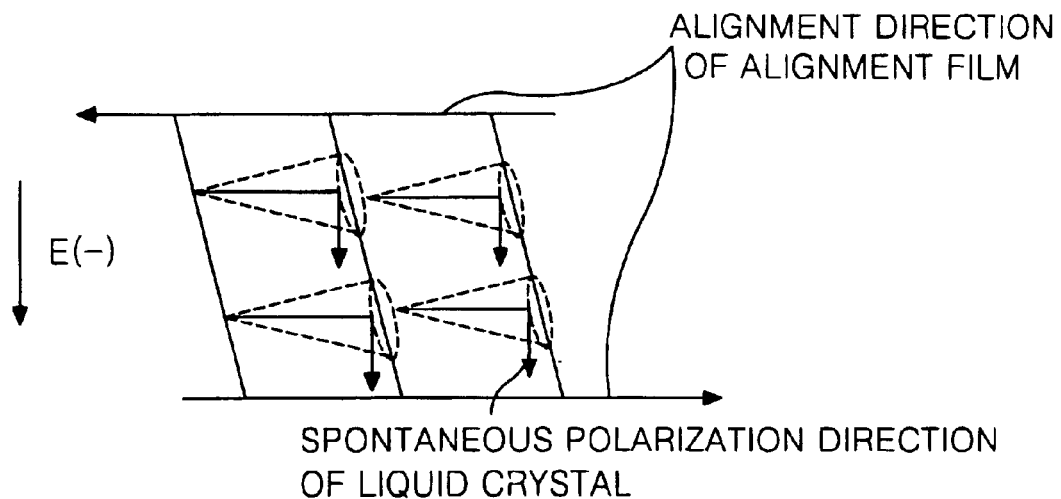
FIG. 5 illustrates a method of applying an electric field to implement the half V-type FLC mode liquid crystal cell.
Figure 6:
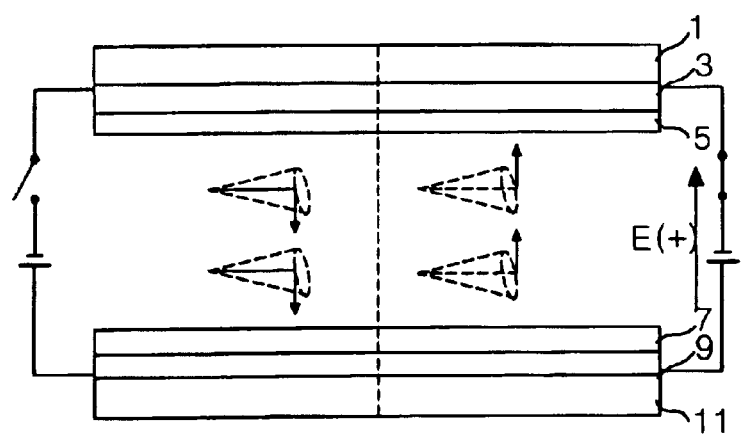
FIG. 6 depicts a motion of a liquid crystal upon application of a voltage to the half V-type FLC mode liquid crystal cell.
Figure 7:
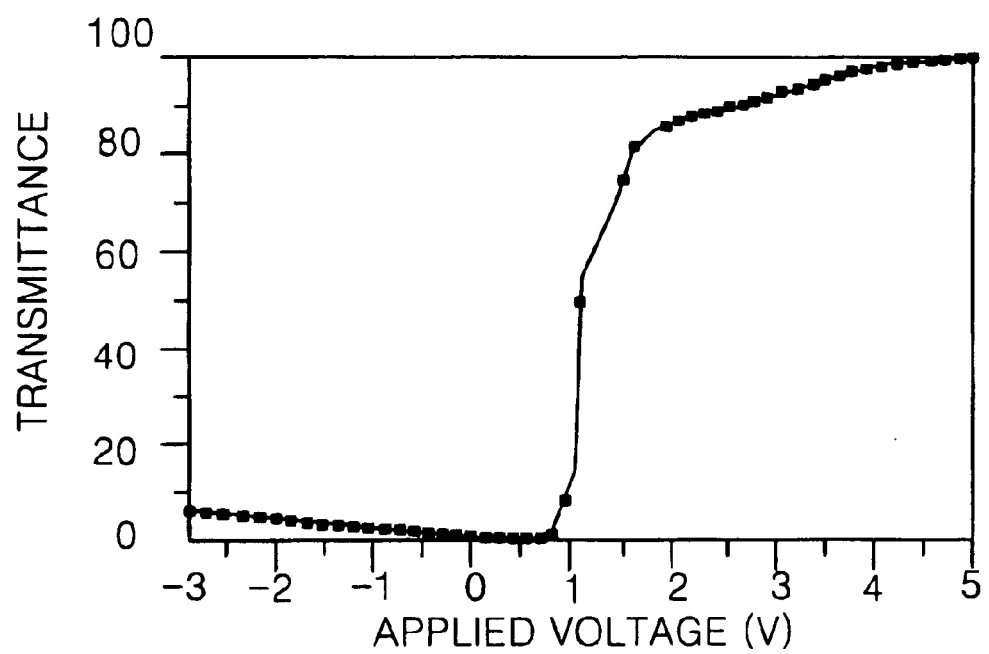
FIG. 7 is a graph representing a transmission characteristic according to a voltage of the half V-type FLC mode liquid crystal cell.
Figure 8:
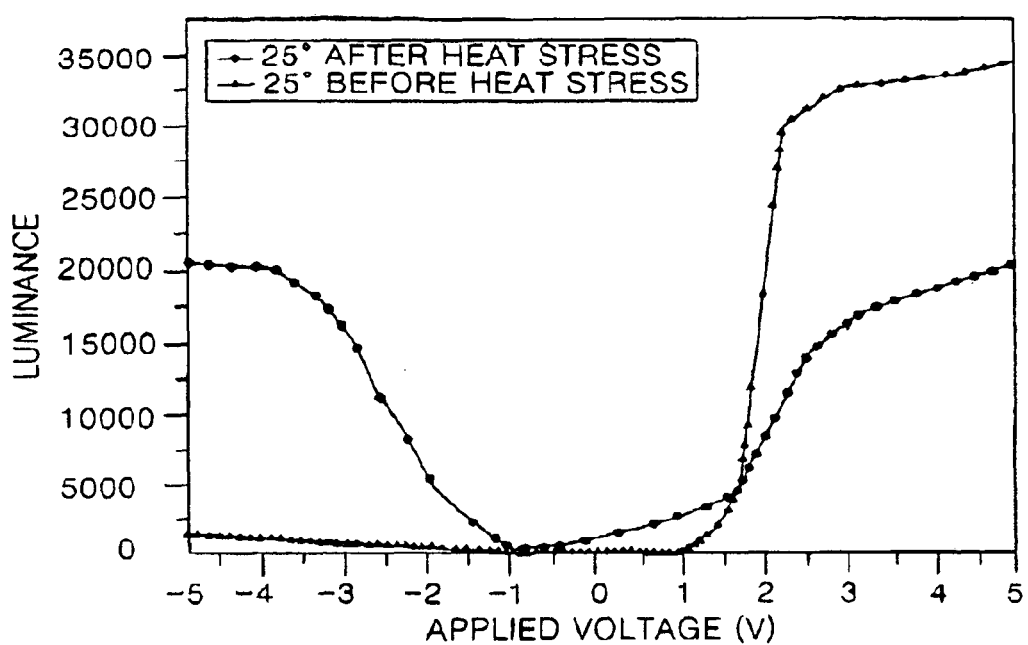
FIG. 8 is a graph representing a transmission characteristic according to a voltage prior to and after a heat treatment of the conventional half V-type FLC mode liquid crystal cell.
Figure 9A:
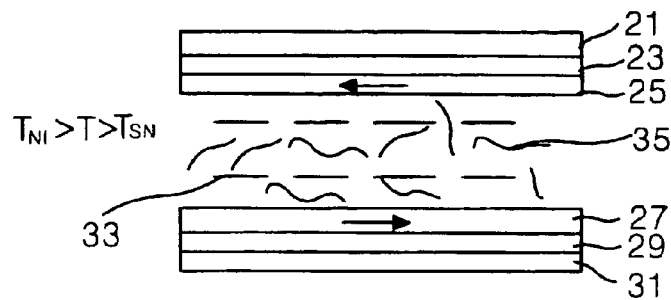
FIG. 9A to FIG. 9D show a method of fabricating a FLC mode liquid crystal cell according to an embodiment of the present invention.

Referring to FIG. 9A, the FLC mode liquid crystal cell includes an upper substrate 21 on which a common electrode 23 and an alignment film 25 which undergoes an alignment treatment, disposed sequentially; a lower substrate 31 on which a TFT array layer 29 including a pixel electrode and an alignment film 27 which undergoes an alignment treatment, disposed sequentially; spacers (not shown) permitting a constant distance between the upper and lower substrates 21 and 31; and a ferroelectric liquid crystal 33 containing a small amount of photo crosslinkable or light-hardening polymer 35 injected into the space between the upper and lower substrates 21 and 31 defined by the spacers. The amount of the photo crosslinkable or light-hardening polymer 35 in the ferroelectric liquid crystal may be small.

The ferroelectric liquid crystal 33 injected between the upper and lower substrates 21 and 31 has an isotropic phase or a nematic phase. The reason why the ferroelectric liquid crystal 33 is injected at a temperature having an isotropic phase or a nematic phase is as follows. Viscosity of a smectic phase liquid crystal is larger than that of a nematic phase liquid crystal, which results in a lower liquid crystal injection speed, and a sheer stress is applied to the alignment films 25 and 27, which causes damage of the alignment films 25 and 27.

Figure 9B:
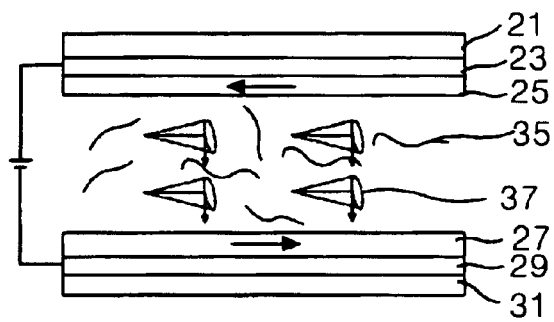

After injection of the ferroelectric liquid crystal, a direct current voltage is applied to the upper and lower substrates 21 and 31 while slowly lowering a temperature of the liquid crystal cell. Thus, as shown in FIG. 9B, while the ferroelectric liquid crystal 37 is being phase-changed into a smectic phase, it is aligned in any one direction of such two states in which a spontaneous polarization direction of the smectic liquid crystal can be aligned with respect to an alignment treatment direction, that is, in a direction identical to a magnetic direction under an attraction of the magnetic field direction formed within the liquid crystal cell. Accordingly, a uniform mono-domain alignment is obtained.

Figure 9C:
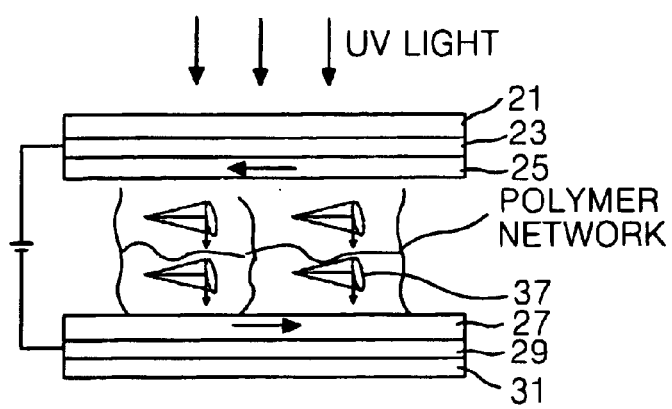
Figure 9D:
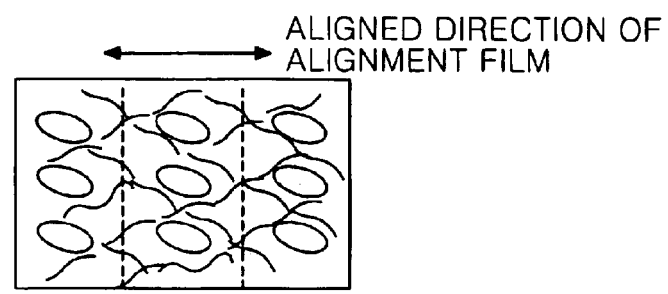

Subsequently, an ultraviolet ray is exposed to the ferroelectric liquid crystal cell aligned uniformly to make a polymer network as shown in FIG. 9C and FIG. 9D. A uniform alignment of the liquid crystal cell made initially can be maintained by the formation of the polymer network.

FIG. 9C is a side view of the liquid crystal cell in which the polymer network has been formed, and FIG. 9D is a plan view representing an alignment treatment direction and a real alignment direction of the liquid crystal. When a liquid crystal is exposed to ultraviolet light, a light intensity and total exposure energy should be appropriately selected. Speaking qualitatively, if total exposure energy to the liquid crystal cell is too small to form the polymer network, then the amount of radicals of the polymer in the liquid crystal layer is increased to cause an ionic contamination source. On the other hand, if total exposure energy to the liquid crystal cell is too large, then molecular binding of the liquid crystal is broken. Accordingly, when a quantity of total exposure energy to the liquid crystal cell is not appropriate, a strong residual image appears in an electro-optical measurement. In addition, a liquid crystal cell having small total exposure energy fails to be sufficient in alignment stability caused by external impact because the polymerization level of a photo crosslinkable or light-hardening polymer is low.

Since the polymer network is sufficiently formed from the above-mentioned relationship, a range of total exposure energy that allows the liquid crystal cell to have a stable alignment state is experimentally provided. Specifically, a total exposure energy range of an appropriate ultraviolet ray is about 240 to about 1200 mJ/cm$^2$. An ultraviolet lamp used in an experiment for determining such a total exposure energy range includes an Hg lamp or a Xe lamp. Ultraviolet light from the ultraviolet lamp is measured by means of a light receiver and a wavelength detecting circuit that are capable of measuring a wavelength range of about 365±100 nm.

A significant parameter other than the above-mentioned total exposure energy for forming the polymer network at the liquid crystal cell is light intensity of an ultraviolet ray. If the light intensity of an ultraviolet ray is too large, then polymerization of a photo crosslinkable or light-hardening polymer is generated too suddenly, thereby scattering an alignment state of the liquid crystal and thus causing a disclination. On the other hand, if the light intensity is too small, then light polymerization time is too long thereby causing difficulty in applying the present technology to a real product. Therefore, the light intensity range of an ultraviolet ray suitable for forming the polymer network is about 1 to about 5 mW/cm$^2$.

Figure 10:
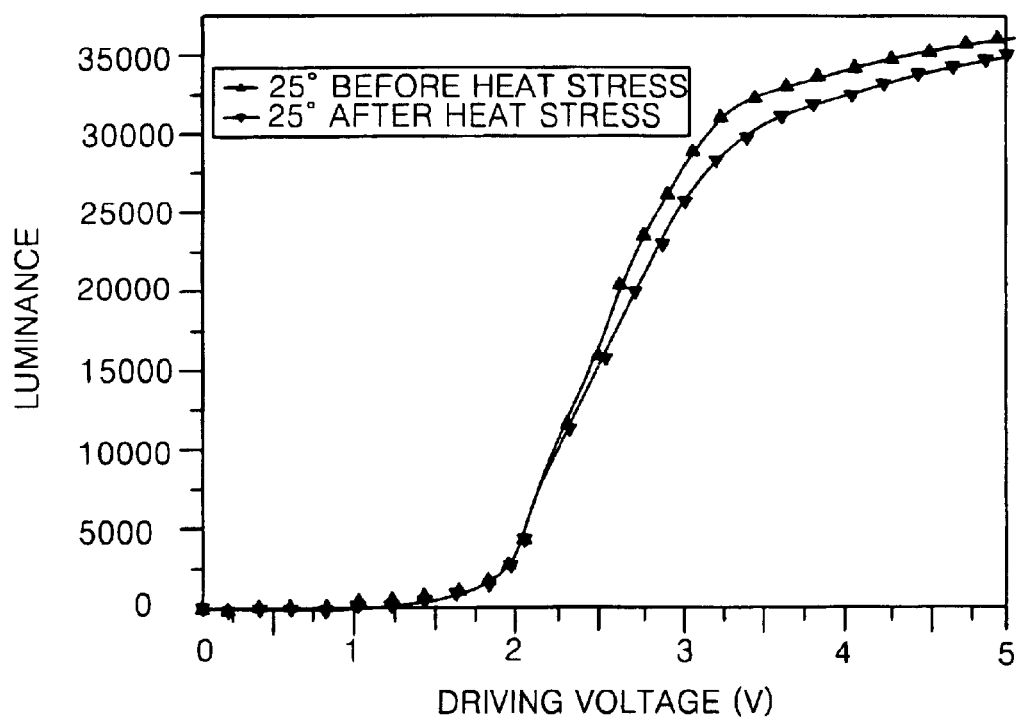
FIG. 10 is a graph representing a transmission characteristic according to a voltage prior to and after a heat treatment of a FLC mode liquid crystal cell according to an embodiment of the present invention.

Referring to FIG. 10, in the present liquid crystal cell having formed the polymer network, the transmission characteristics according to voltages prior to and after an application of a heat stress above a phase transition temperature becomes almost similar to each other. This means that, even though an alignment state of the liquid crystal is broken above a temperature causing a phase transition from a smectic phase into a nematic phase, it is returned to an initial uniform alignment state with the aid of the polymer network when the temperature of the liquid crystal cell is again lowered to a temperature causing a phase change of the liquid crystal into a smectic phase. In other words, it becomes possible to easily obtain a uniform alignment state of the liquid crystal even when a uniform alignment state of the liquid crystal is broken in accordance with external temperature variation. Accordingly, external temperature variation barely affects a transmission characteristic according to a voltage of the liquid crystal cell.

As described above, the ferroelectric liquid crystal display according to the present invention forms the polymer network, thereby maintaining a more stable alignment state against external heat stress or other physical impact in comparison to the prior art ferroelectric liquid crystal display.

It will be apparent to those skilled in the art that various modifications and variations can be made in the present invention without departing from the spirit and scope of the invention. Thus, it is intended that the present invention cover the modification and variations of this invention provided they are within the scope of the appended claims and their equivalents.

What is claimed is:

1. A method of fabricating a ferroelectric liquid crystal display, comprising:

joining an upper substrate provided with a transparent electrode and an alignment film to a lower substrate opposed to the upper substrate and provided with a pixel electrode and an alignment film;

providing a ferroelectric liquid crystal having a photo crosslinkable or light-hardening polymer between the joined upper and lower substrates;

uniformly aligning the ferroelectric liquid crystal by applying a direct current voltage to the electrodes of the upper and lower substrates; and exposing an ultraviolet light to the uniformly aligned ferroelectric liquid crystal to form a polymer network after the ferroelectric liquid crystal is changed from a nematic phase or an isotropic phase into a smectic phase.

2. The method according to claim 1, wherein a temperature upon injection of the ferroelectric liquid crystal is above a temperature which causes a phase transition from a smectic phase into a nematic phase.

3. The method according to claim 1, wherein a temperature is varied such that the ferroelectric liquid crystal is changed from the nematic phase or the isotropic phase into the smectic phase at least once when the ferroelectric liquid crystal is uniformly aligned.

4. The method according to claim 1, wherein a light intensity range of an ultraviolet light exposed when the polymer network is formed is about 1 to about 5 mW/cm$^2$.

5. The method according to claim 1, wherein a range of total exposure energy of the ultraviolet light exposed when the polymer is formed is about 240 to about 1200 mJ/cm$^2$.

6. The method according to claim 1, wherein an ultraviolet lamp for generating the ultraviolet light is selected from any one of a Hg lamp and a Xe lamp.

7. The method according to claim 6, wherein a wavelength range of the ultraviolet light is about 365±100 nm.

8. The method according to claim 1, wherein the polymer network maintains the uniform alignment.

9. The method according to claim 8, wherein the uniform alignment is a mono-domain alignment.

* * * * *